United States Patent
Molnar, Jr.

(10) Patent No.: US 11,220,913 B2
(45) Date of Patent: Jan. 11, 2022

(54) GAS TURBINE ENGINE BLADES WITH AIRFOIL PLUGS FOR SELECTED TUNING

(71) Applicant: Rolls-Royce Corporation, Indianapolis, IN (US)

(72) Inventor: Daniel E. Molnar, Jr., Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 93 days.

(21) Appl. No.: 16/661,566

(22) Filed: Oct. 23, 2019

(65) Prior Publication Data
US 2021/0123347 A1 Apr. 29, 2021

(51) Int. Cl.
*F01D 5/16* (2006.01)

(52) U.S. Cl.
CPC ............ *F01D 5/16* (2013.01); *F05D 2220/32* (2013.01); *F05D 2230/10* (2013.01); *F05D 2230/60* (2013.01); *F05D 2260/96* (2013.01)

(58) Field of Classification Search
CPC ... F01D 5/16; F01D 5/26; F01D 5/027; F01D 5/146; F01D 5/10; F04D 29/66; F04D 29/661; F04D 29/662; F16F 15/32
See application file for complete search history.

(56) References Cited

U.S. PATENT DOCUMENTS

| | | | | |
|---|---|---|---|---|
| 1,603,076 A | * | 10/1926 | Hanson | F04D 29/662 415/130 |
| 3,754,838 A | * | 8/1973 | Fu | F01D 5/16 416/145 |
| 4,097,192 A | | 6/1978 | Kulina | |
| 4,178,667 A | * | 12/1979 | Stevens | F01D 5/16 29/407.07 |
| 4,776,763 A | * | 10/1988 | Light | F01D 5/027 416/144 |
| 5,273,398 A | * | 12/1993 | Reinfelder | B64C 27/008 416/144 |
| 5,314,282 A | | 5/1994 | Murphy et al. | |
| 5,913,661 A | * | 6/1999 | Panovsky | F01D 5/147 416/229 A |
| 6,428,278 B1 | | 8/2002 | Montgomery et al. | |

(Continued)

FOREIGN PATENT DOCUMENTS

| | | |
|---|---|---|
| DE | 1627779 A1 | 7/1971 |
| EP | 0924380 A2 | 6/1999 |

(Continued)

OTHER PUBLICATIONS

European Search Report, European Application No. 20201439.5-1004, dated Jan. 20, 2021, 12 pages.

*Primary Examiner* — Topaz L. Elliott
(74) *Attorney, Agent, or Firm* — Barnes & Thornburg LLP

(57) ABSTRACT

A rotor for use in a gas turbine engine includes a wheel and a plurality of blades. The wheel is arrange about an axis of the gas turbine engine for rotation. The plurality of blades are arranged around the wheel and extend radially outward from the wheel to interact with gases flowing through the engine. One or more of the plurlaty of blades is formed to include a hole that extends into an external surface of the blade and a plug located in the first hole. The blade and the plug are made of different materials or have different densities to vary the frequency response of the blade.

14 Claims, 4 Drawing Sheets

(56) References Cited

U.S. PATENT DOCUMENTS

| | | | |
|---|---|---|---|
| 7,033,131 B2 | 4/2006 | Schreiber | |
| 7,147,437 B2 * | 12/2006 | Burdgick | F01D 5/147 416/1 |
| 7,500,299 B2 | 3/2009 | Dupeux et al. | |
| 7,766,625 B2 * | 8/2010 | Burdgick | F01D 5/282 416/230 |
| 8,241,003 B2 * | 8/2012 | Roberge | F04D 29/023 416/229 R |
| 8,656,589 B2 | 2/2014 | Elli | |
| 9,670,900 B2 | 6/2017 | Carroll et al. | |
| 9,932,840 B2 * | 4/2018 | Fulayter | F01D 5/146 |
| 10,041,359 B2 * | 8/2018 | Brandl | F01D 5/147 |
| 10,786,877 B2 * | 9/2020 | Queant | B21J 15/02 |
| 10,830,067 B2 * | 11/2020 | Kray | F01D 5/16 |
| 2006/0029501 A1 * | 2/2006 | Burdgick | F01D 5/16 416/224 |
| 2007/0231154 A1 * | 10/2007 | Burdgick | F01D 5/26 416/230 |
| 2008/0134504 A1 | 6/2008 | Schoenenborn | |
| 2008/0253887 A1 * | 10/2008 | Cairo | F04D 29/023 415/221 |
| 2009/0185911 A1 * | 7/2009 | Roberge | F01D 5/147 416/236 R |
| 2009/0191047 A1 * | 7/2009 | Schlinker | F04D 29/666 415/119 |
| 2010/0189561 A1 * | 7/2010 | Vettese | F03D 1/065 416/144 |
| 2015/0322797 A1 * | 11/2015 | Snyder | F01D 5/16 416/229 R |
| 2015/0322803 A1 * | 11/2015 | Fulayter | F01D 5/26 416/231 B |
| 2016/0053617 A1 | 2/2016 | Grelotti et al. | |
| 2016/0130953 A1 * | 5/2016 | Brandl | F01D 5/186 416/95 |
| 2016/0290137 A1 * | 10/2016 | Li | F01D 5/141 |
| 2016/0333894 A1 | 11/2016 | K. et al. | |
| 2017/0175776 A1 | 6/2017 | Theratil et al. | |
| 2017/0211391 A1 * | 7/2017 | Wygant | F01D 5/26 |
| 2018/0003063 A1 | 1/2018 | Doorbar | |
| 2018/0216469 A1 * | 8/2018 | Hoskin | F01D 5/26 |
| 2019/0284943 A1 * | 9/2019 | Kray | F01D 5/16 |

FOREIGN PATENT DOCUMENTS

| | | | | |
|---|---|---|---|---|
| EP | 1640562 A1 * | 3/2006 | | F01D 5/16 |
| EP | 2942481 A1 | 11/2015 | | |
| FR | 1024218 A * | 3/1953 | | F01D 5/16 |
| GB | 1089247 A * | 11/1967 | | F01D 5/147 |
| GB | 1272169 A * | 4/1972 | | F01D 5/16 |
| GB | 2015660 A | 9/1979 | | |
| JP | 61181794 A * | 8/1986 | | F01D 5/16 |

\* cited by examiner

GAS TURBINE ENGINE BLADES WITH AIRFOIL PLUGS FOR SELECTED TUNING

FIELD OF THE DISCLOSURE

The present disclosure relates generally to gas turbine engines, and more specifically to rotors having airfoils for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted by rows of rotating blades and non-rotating vanes to drive the compressor and, sometimes, an output shaft. Each blade and vane has an airfoil that interacts with gases as they pass through the engine.

Airfoils have natural vibration modes of increasing frequency and complexity of the mode shape. The simplest and lowest frequency modes are typically referred to as the first bending mode, the second bending mode, the third bending mode, and the first torsion mode. The first bending mode is a motion normal to the working surface of an airfoil in which the entire space of the airfoil moves in the same direction. The second bending mode is similar to the first bending mode, but with a change in the sense of the motion somewhere along the span of the airfoil, so that the upper and lower portions of the airfoil move in opposite directions. The third bending mode is similar to the second bending mode, but with two changes in the sense of motion somewhere along the span of the airfoil. The first torsion mode is a twisting motion around an axis that is parallel to the span of the airfoil, in which the entire space of the airfoil, on either side of the axis moves in the same direction.

Blades may be subject to destructive vibrations induced by unsteady interaction of the airfoils of those blades with gases passing through a gas turbine engine. One type of vibration is flutter, which is an aero-elastic instability resulting from interaction of the flow over the airfoils of the blades and the blades' natural vibration tendencies. The lowest frequency vibration modes, the first bending mode and the first torsion mode, are often the vibration modes that are susceptible to flutter. When flutter occurs, the unsteady aerodynamic forces on the blade, due to its vibration, add energy to the vibration, causing the vibration amplitude to increase. The vibration amplitude can become large enough to cause damage to a blade. Another type of vibration is known as forced response, which is an aero-elastic response to inlet distortion or wakes from upstream airfoils, struts, or any other flow obstruction. The operable range, in terms of pressure rise and flow rate, of turbomachinery can sometimes be restructured by flutter and forced response phenomena.

The specific susceptibility of a blade to flutter may be increased if all the blades on a rotor are identical in terms of their vibration frequencies. Sometimes, intentional variations may be introduced into blades during manufacturing to create structural mistuning of a rotor and provided flutter resistance.

SUMMARY

The present disclosure may comprise one or more of the following features and combinations thereof.

A rotor for use in a gas turbine engine may include a wheel, a first blade, and a first plug. The wheel may be arranged around an axis. The first blade may comprise a first material and extend radially outwardly away from the wheel relative to the axis. The first blade may interact with gases surrounding the rotor. The first plug may comprise a second material that is different than the first material of the first blade.

In some embodiments, the first blade may have a first external surface, a second external surface, and a first hole. The second external surface may be opposite the first external surface to define a leading edge, trailing edge, pressure side, and suction side of the first blade. The first hole may extend through the first external surface and into the first blade in a direction normal to the first external surface. In some embodiments, the first plug may be located in the first hole.

In some embodiments, the first plug may have a first outer surface. The first outer surface may be flush with the first external surface of the first blade such that the first outer surface is exposed to the gases surrounding the rotor.

In some embodiments, the first hole may be a through hole. The through hole may extend entirely through the first external surface and the second external surface.

In some embodiments, the first plug includes a second outer surface. The second outer surface may be flush with the second external surface and exposed to the gases surrounding the rotor.

In some embodiments, the first blade includes a base and a blade tip. The base may be located adjacent the wheel. The blade tip may be spaced apart radially outward from the base. In some embodiments, the first hole may be located at the blade tip.

In some embodiments, the first hole may be located at one of the leading edge and the trailing edge of the first blade.

In some embodiments, the first material may comprise metallic materials. In some embodiments, the second material may comprise polymeric materials.

In some embodiments, the first plug may include a side wall. The side wall may extend between the first outer surface and the second outer surface.

In some embodiments, the first blade may be at least partially hollow in the blade tip. The side wall of the first plug may be exposed to a cavity formed in the blade tip.

In some embodiments, the first hole may be a blind hole. The blind hole may extend only partway in to the first blade.

In some embodiments, the rotor may further include a second blade and a second plug. The second blade may extend radially away from the wheel. The second plug may be coupled with the second blade. In some embodiments, the second blade may directly neighbor the first blade circumferentially.

In some embodiments, the second blade may have a first external surface, a second external surface, and a second hole. The second external surface may be opposite the first external surface of the second blade to define a leading edge, a trailing edge, a pressure side, and a suction side of the second blade. The second hole may extend into the second blade in a direction normal to the first external surface of the second blade. In some embodiments, the second plug may be located in the second hole.

In some embodiments, the second plug may comprise a third material. The third material may be different than the second material._

In some embodiments, the second material may have a density greater than a density of the first material. The third material may have a density that is less than the density of the first material.

According to another aspect of the present disclosure, a rotor for use in a gas turbine engine may include a wheel, a first blade, and a first plug. The wheel may be arranged around an axis. The first blade may be adapted to interact with gasses surrounding the first blade. The first plug may extend into the first blade.

In some embodiments, the first blade may have a first external surface and a second external surface. The second external surface may be opposite the first external surface to define a leading edge, trailing edge, pressure side, and suction side of the first blade. In some embodiments, The first plug may extend into the first external surface of the first blade.

In some embodiments, the first external surface and the second external surface may be adapted to be exposed to and interact with gases surrounding the first blade. In some embodiments, the first external surface and the second external surface may extend radially relative to the axis.

In some embodiments, the first plug may comprise polymeric materials. In some embodiments, the first plug may extend entirely through the first blade and may be flush with the first external surface and the second external surface. In some embodiments, the first plug may extend axially and circumferentially through the first blade.

In some embodiments, the first blade may include a base and a blade tip. The base may be located adjacent the wheel. The blade tip may be spaced apart radially outward from the base.

In some embodiments, the first plug may be located at the blade tip. In some embodiments, the first plug may be located at one of the leading edge and the trailing edge of the first blade.

In some embodiments, the rotor may further include a second blade and a second plug. The second blade may extend radially away from the wheel. The second plug may be coupled with the second blade. In some embodiments, the second blade may directly neighbor the first blade circumferentially.

In some embodiments, the second blade may have a first external surface and a second external surface. The second external surface may be opposite the first external surface of the second blade to define a leading edge, a trailing edge, a pressure side, and a suction side of the second blade.

In some embodiments, the second plug may extend into the first external surface of the second blade. In some embodiments, the second plug may have a density that is different than a density of the first plug.

In some embodiments, the first plug may comprise a first material. The first material may have a density that is greater than a density of the first blade.

In some embodiments, the second plug may comprise a second material. The second material may have a density that is less than a density of the first blade.

According to another aspect of the present disclosure, a method may include providing a rotor that may have a wheel and a plurality of blades. The wheel may be arranged around an axis. The plurality of blades may extend radially outward away from the wheel.

In some embodiments, the method may include measuring a frequency response of the rotor to obtain frequency data of the rotor and identifying a first blade included in the plurality of blades to vary a frequency response of the first blade based on the frequency data. In some embodiments, the method further includes forming a first hole that extends into a radially extending external surface of the first blade at a first location, the first location being based on the frequency data, forming a first plug made of a first material with a first density, the first density being selected based on the frequency data, and inserting the first plug into the first hole formed in the first blade to vary the frequency response of the rotor.

In some embodiments, the first hole may extend into the external surface of the first blade in a direction normal to the external surface. In some embodiments, the first hole may be a through hole that extends through the first blade.

In some embodiments, the method may further include identifying a second blade included in the plurality of blades, forming a second hole that extends into a radially extending external surface of the second blade at a second location, the second location being based on the frequency data, forming a second plug made of a second material with a second density, the second density material being selected based on the frequency data, and the second density being different than the first density, and inserting the second plug into the second hole formed in the second blade to vary the frequency response of the rotor.

These and other features of the present disclosure will become more apparent from the following description of the illustrative embodiments.

DETAILED DESCRIPTION OF THE DRAWINGS

Figure 1:
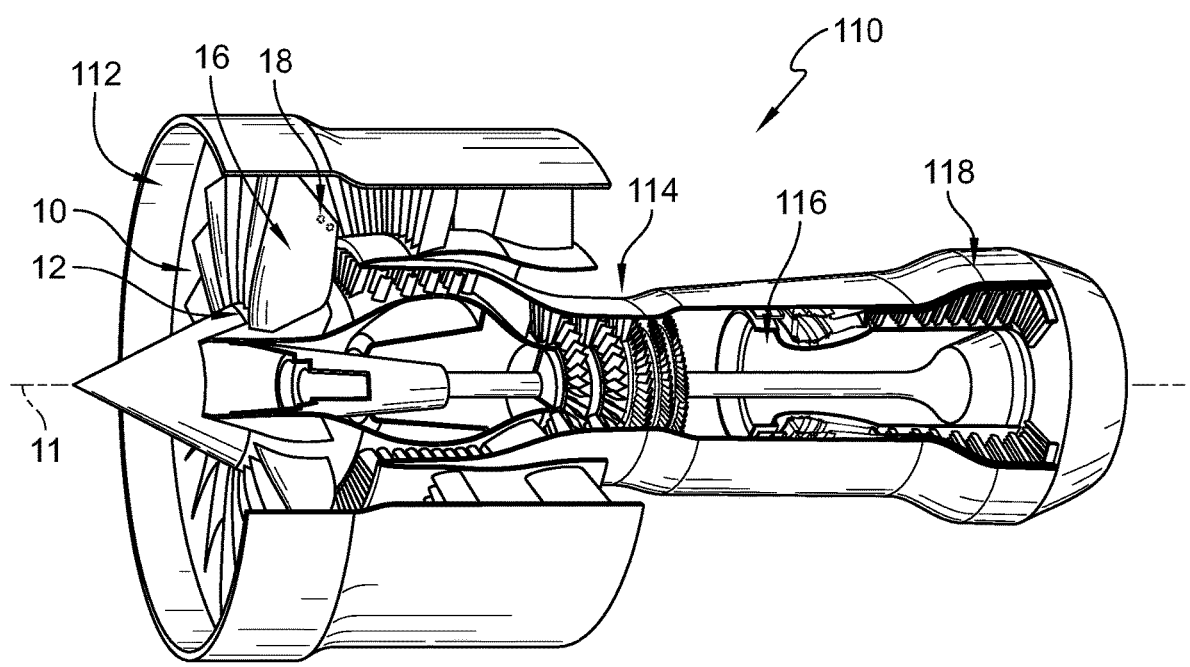
FIG. 1 is a cutaway view of a gas turbine engine that includes a fan, a compressor, a combustor, and a turbine, the fan having a rotor including a wheel arranged around an axis of the engine and a plurality of blades arranged around the wheel that each extend radially outward from the wheel to interact with gases flowing through the engine and suggesting that some of the fan blades include mistuning plugs configured to vary a resonance frequencies of the blades.

For the purposes of promoting an understanding of the principles of the disclosure, reference will now be made to a number of illustrative embodiments illustrated in the drawings and specific language will be used to describe the same.

Figure 2:
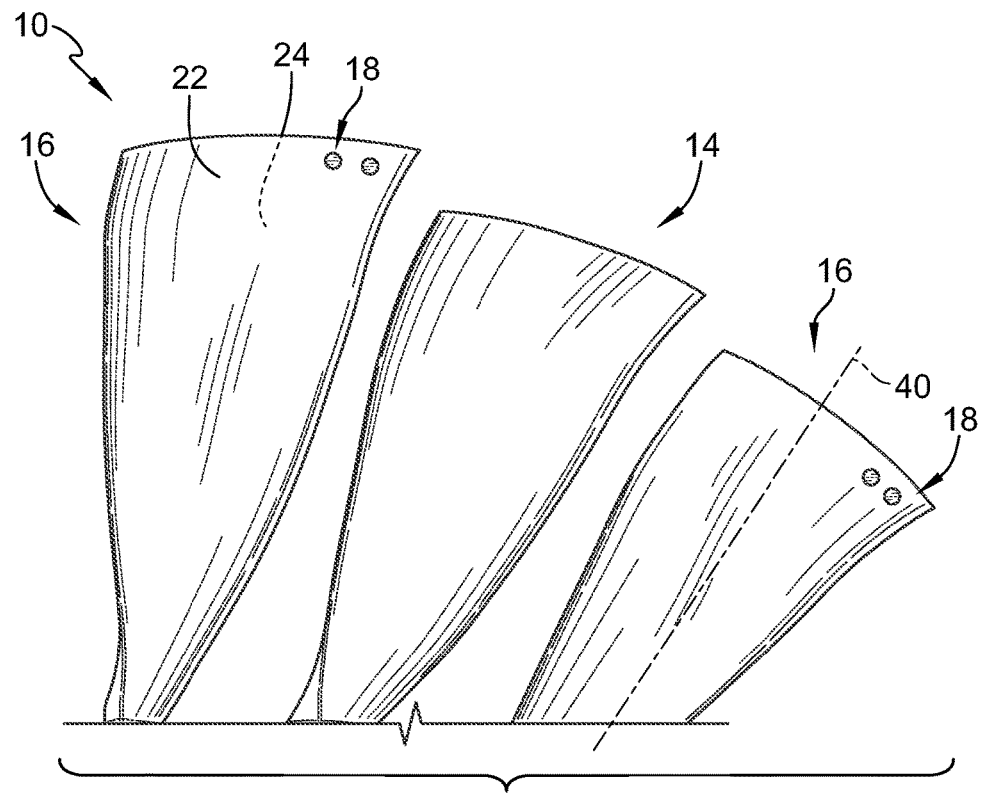
FIG. 2 is a perspective view of a portion of the plurality of blades included in the fan of FIG. 1 showing the rotor further includes plugs comprising a material of a different density than that of the bodies of the blades and suggesting that the plugs extend through a tip of the blade to change the mass of the blade tip to alter the resonance frequencies of the blade.

A bladed rotor 10 includes a plurality of blades 14, 16 and plugs 18 that are coupled with the blades 14, 16 to purposefully mistune the bladed rotor 10 to avoid flutter and high vibrations as suggested in FIGS. 1 and 2. The plugs 18 extend through external surfaces 22, 24 near tips of the blades 14, 16 in illustrative embodiments as shown in FIG. 2.

The bladed rotor 10 is adapted for use in a gas turbine engine that includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112. In the illustrative embodiment, the fan 112 includes the rotor 10.

The rotor 10 includes a wheel 12, the plurality of blades 14, 16, and the plurality of plugs 18 as shown in FIG. 2. The wheel 12 is arranged around the axis 11. The blades 14, 16 comprise a first material and are arranged around the wheel 12 and each extend radially outwardly away from the wheel 12 relative to the axis 11 to interact with gases surrounding the rotor 10. The first material is a metallic material in the illustrative embodiment.

The plurality of blades 14, 16 are divided into a set of first frequency blades 14 and a set of second frequency blades 16 as shown in FIG. 2. In other embodiments, additional numbers of frequency blade groups may be used. Each of the first frequency blades 14 and the second frequency blades 16 are similarly sized and shaped. However, the second frequency blades 16 are configured to receive at least one plug 18 comprising a second material different from the first material of the blades 14, 16. The plugs 18 are added to the blades 16 to change the mass of the blades to mistune some of the plurality of blades 16 and reduce flutter effects induced into the rotor 10 during operation of the engine 110.

In the illustrative embodiment, the second frequency blades 16 are alternated every other blade between the first frequency blades 14 about the wheel 12. In other embodiments, two second frequency blades 16 may be located next to four first frequency blades 14 on each circumferential side of the blades 16. In other embodiments, the other combinations of the first frequency blades 14 and the second frequency blades 16 may be used. In some embodiments, the frequency of the blades 14, 16 may be measured prior to mistuning such that a desired combination of first and second frequency blades 14, 16 may be combined to develop a unique mistuning profile with the plugs 18.

Flutter may be a common aerodynamic phenomenon that may lead to excessive blade vibratory stress and eventual blade failure. Reducing the phenomenon may be difficult when combined with other requirements of the blades 14, 16, such as structural strength and aerodynamic performance. In some embodiments, mistuning blades may include changing the existing airfoil shape of some of the blades about the rotor. Yet, such arrangements may cause conflicting issues with the other original blades, such as forced response.

As such, each of the plugs 18 is added to the blade 16 to mistune each blade 16 without affecting the airfoil shape of the blade 16. The different second material of the plugs 18 alters the frequency of each of the blades 16 by changing the overall mass of the blade 16, but allows the plug 18 to match the contour of outer surface 22, 24 of each blade 16. Therefore, the flutter effects may be reduced, while the aerodynamic shape of the blade 16 is maintained. Different second materials may be used to fine-tune the blade frequencies.

In the illustrative embodiment, the first material comprises metallic materials, while the second material comprises polymeric materials. In other embodiments, the second material may metallic. The second material may be, for example, one of aluminum, titanium, steel, nickel, and tungsten. The second material is a material that provides a density differential when compared to the first material significant enough to vary the frequency response of the blade. The density differential between the first and second materials adds to the mistuning of the blades.

Figure 3:
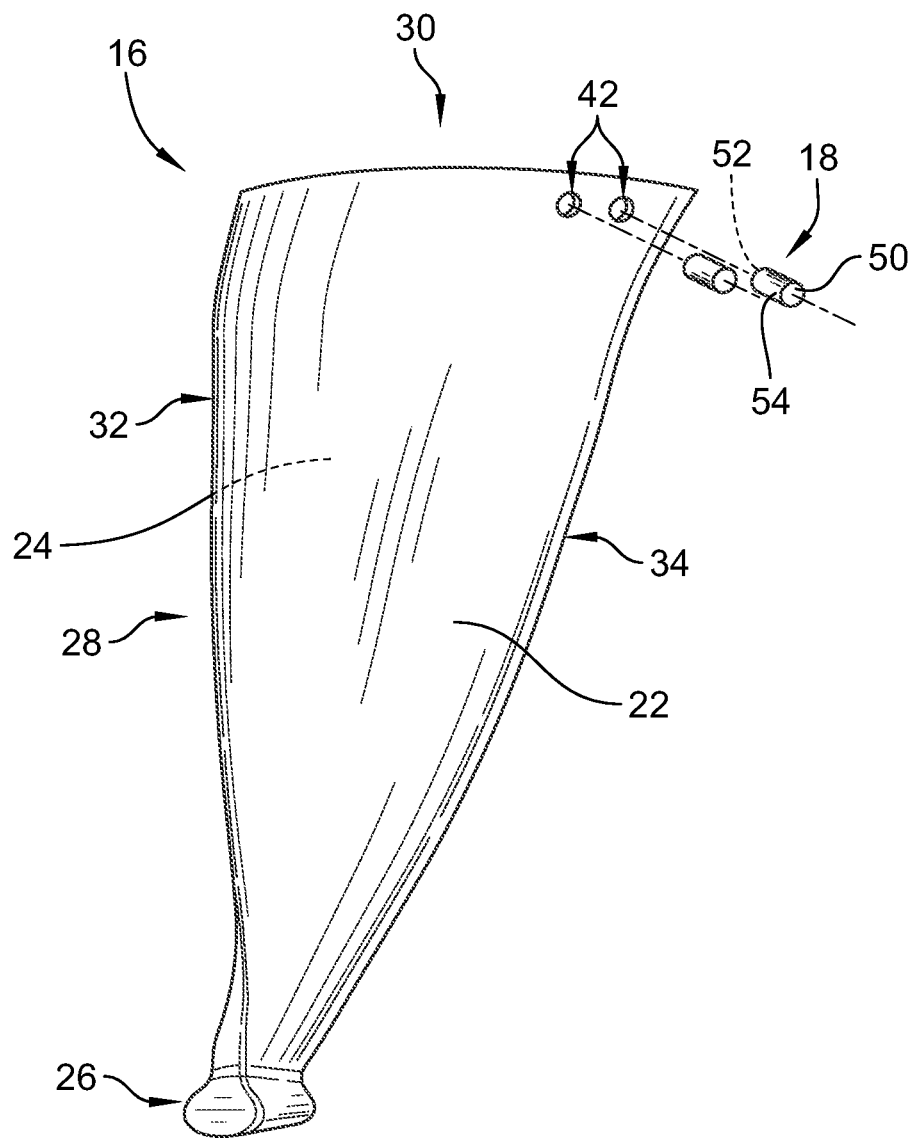
FIG. 3 is an exploded view of one of the blades of FIG. 2 showing the plugs are adapted to fit into through holes formed in the blade tip.
Figure 4:
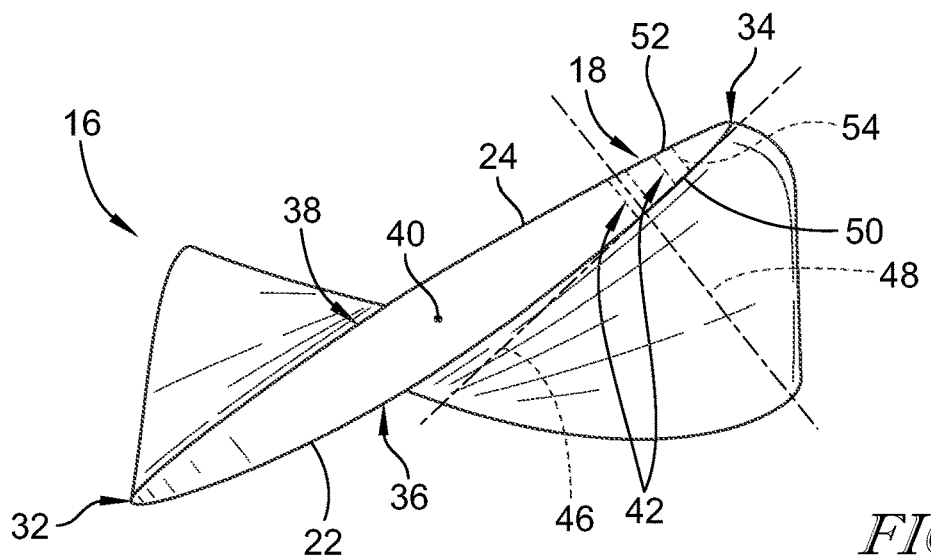
FIG. 4 is a top view of the blade of FIG. 3 showing the plugs extend through the blade tip so that outer surfaces of the plugs are flush with external surfaces of the blade.

Turning again to the plurality of blades 14, 16, each blade 14, 16 has a base 26 and an airfoil 28 shown in FIGS. 3 and 4. The base 26 is located adjacent the wheel 12. The airfoil 28 has an aerodynamic shape for accelerating air through the gas turbine engine 110 and extends radially outward from the base 26. The airfoil 28 further includes a first external surface 22, a second external surface 24, and a blade tip 30 as shown FIGS. 3-4. The second external surface 24 is opposite the first external surface 22 to define a leading edge 32, a trailing edge 34, a pressure side 36, and a suction side 38 of the blade 14, 16. The blade tip 30 is spaced apart radially outward from the base 26.

In the illustrative embodiment, the base 26 of each blade 14, 16 is a root 26 as shown in FIG. 3. The root 26 is shaped to be received in a corresponding slot in the wheel 12 to couple the blade 14, 16 to the wheel 12. In some embodiments, the base 26 may be another suitable attachment method. In other embodiments, the rotor 10 is a blade disk or blisk and the blades 14, 16 are integrally formed with the wheel 12.

Each of the blades 14, 16 also has a first torsion node line 40 as shown in FIG. 2. The first torsion node line 40 extends radially along the blade 14, 16. The first torsion node line 40, in addition to first, second, and third bend modes (not shown) make up low order modes that may affect the frequency of each of the blades 14, 16. Other modes, i.e. other bend and torsion modes may be included in the low order modes of other blade embodiments.

In the illustrative embodiment, the torsion node line 40 divides the blade 14, 16 into a forward section and an aft section. The forward section includes the leading edge 32, while the aft section includes the trailing edge 34.

Each of the second frequency blades 16 further includes at least one hole 42 as shown in FIGS. 3 and 4. The hole 42 extends through the first external surface 22, into the blade 16, and out through the second external surface 24 in a direction normal to the first external surface 22 at the blade tip 30.

In the illustrative embodiment, the external surface 22 direction is indicated by the line 46, while the direction normal to the external surface 22 is indicated by the line 48 as shown in FIG. 4. In other embodiments, the hole 42 may extend through the blade 16 at an angle relative to the line 48.

Figure 5:
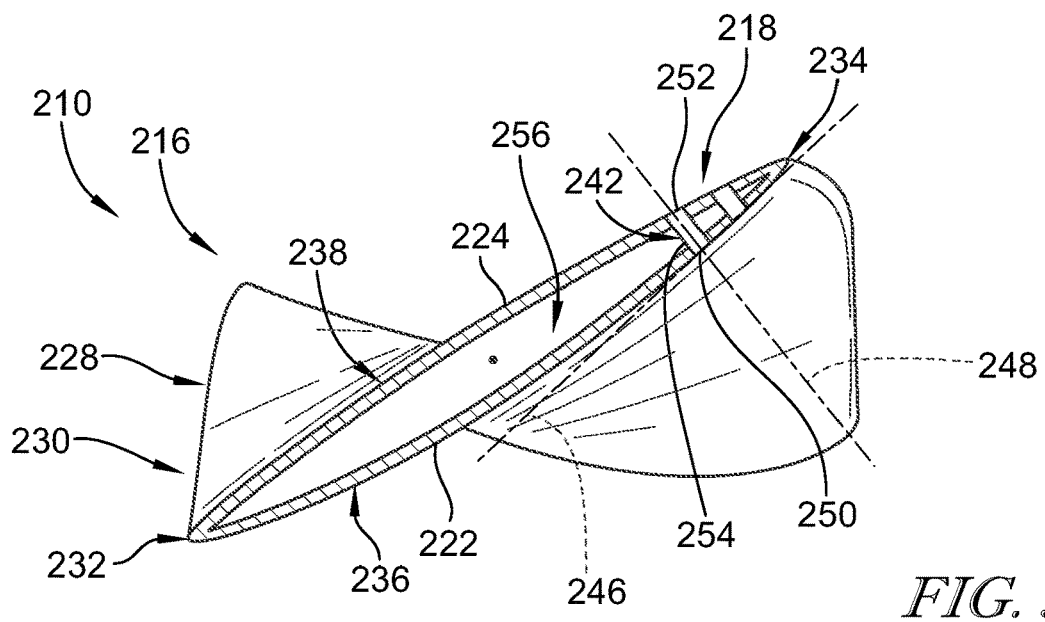
FIG. 5 is another embodiment of a rotor for use in the gas turbine engine of FIG. 1 showing the rotor includes at least one blade that is hollow with a cavity extending through a tip of the blade and plugs that extend through the blade tip such that a portion of the plug is exposed to the cavity.

In the illustrative embodiment, the second frequency blades 16 include at least two holes 42 that extend through the blade 16 in the direction 46 normal to the first external surface 22. In the illustrative embodiment, the two holes 42 together decrease the peak stress in the blade tip 30 as opposed to one hole 42. In other embodiments, the second frequency blades 16 may include more than two holes 42 with a plug 18 located in each hole 42 or a single hole 42. The blades 14, 16 are solid material including the tip 30 as shown in FIG. 4. In other embodiments, a portion of the blades 14, 16 may be hollow with the tip 30 being solid material, which may look similar to the radial top view of FIG. 4. In other embodiments, the blades 14, 16 may be hollow including the tip as shown in FIG. 5.

In the illustrative embodiment, the holes 42 are all the same size (i.e. each hole 42 has the same diameter). In other embodiments, some of the holes 42 may be larger in diameter than others. In such embodiments, the plug 18 received in the larger holes 42 may have be larger than the plugs 18 in the smaller holes 42.

In the illustrative embodiments, the holes 42 are circular in shape as shown in FIG. 3. In other embodiments, the holes 42 may be another suitable shape with the plug 18 shaped to match the shape of the corresponding holes 42.

In some embodiments, the shape of the holes 42 may be selected to concentrate the material density of the plugs 18. In such embodiments, the concentrating the material may be more efficient than drilling multiple holes 42. In some embodiments, the holes 42 may be a rectangular shape extending along the blade tip 30. In other embodiments, the holes 42 may be an ellipse shape.

In the illustrative embodiment, the holes 42 are located at the trailing edge 34 of the blade 16. In other embodiments, the holes 42 may be located aft of the first torsion node line 40 toward the trailing edge 34, but spaced apart from the trailing edge 34. In other embodiments, the holes 42 may be located at the leading edge 32 of the blade 16. In other embodiments, the holes 42 are located forward of the first torsion line 40 toward the leading edge but spaced apart from the leading edge 32. In other embodiments, the holes 42 may be located anywhere along the blade tip 30 on either side of the first torsion node line 40. Typically, moving the holes 42 and plugs 18 further away from the first torsion node line 40 results in a greater change to the frequency response for a given size and density of one of the plugs 18. The location of the hole 42 may be dependent upon the frequency desired for the blade 16. Therefore, the location of the hole 42 may be altered depending on the frequency of the blade 16.

Each plug 18 includes a first outer surface 50, a second outer surface 52, and a side surface 54 as shown in FIGS. 3 and 4. The first outer surface 50 is flush with the first external surface 22 of the blade 16. The second outer surface 52 is flush with the second external surface 24 of the blade 16. The first and second outer surfaces 50, 52 are flush with the corresponding external surfaces 22, 24 such that the outer surfaces 50, 52 are exposed to the gases surrounding the rotor 10. The side surface 54 extends between and interconnects the first outer surface 50 and the second outer surface 52. In the illustrative embodiment, each plug 18 is sized so the first and second outer surfaces 50, 52 are flush with the external surfaces 22, 24 of the blade 16 to maintain the airfoil shape of the blade 16 without effecting the aerodynamics of the blade 16.

In some embodiments, the plugs 18 are press fit into the holes 42. As such, the holes 42 have a smaller diameter than the plugs 18. In other embodiments, the plugs 18 may be threaded into place within the holes 42. In other embodiments, the plugs 18 may be adhered to the holes 42. In other embodiments, once the plugs 18 are inserted in the holes 42, excess material not flush with the external surfaces 22, 24 may be machined or polished off to ensure a flush aerodynamic surface 22, 24.

A method of assembling and using the rotor 10 may include several steps. The method includes measuring a frequency response of the rotor 10 to obtain frequency data of the rotor 10, identifying one of the blades 16 included in the plurality of blades 14, 16 to vary a frequency response of the blade 16 based on the frequency data, and forming a first hole 42 that extends through the blade 16 in the direction normal to the external surface 22, 24 at a first location.

In the illustrative embodiment, the first location is based on the frequency data obtained during the measuring step. The first location may be at the trailing edge 34 of the blade 16 in some embodiments. In other embodiments, the first location may be at the leading edge 32 of the blade 16 in some embodiments. In other embodiments, the first location may be at any other location along the blade tip 30.

The method further includes forming a plug 18 made of the second material with a first density. The first density is selected based on the frequency data. The method further includes inserting the plug 18 into the first hole 42 formed in the first blade to vary the frequency response of the rotor 10.

In the illustrative embodiment, the method may further include forming a second hole 42 different from the first hole 42 that extends through the blade 16 in the direction normal to the external surface 22, 24 at a second location. The second location is spaced apart from the first location along the blade tip 30.

The method further includes forming another plug 18 made of the second material with the first density. The method further includes inserting the plug 18 into the second hole 42 formed in the first blade to vary the frequency response of the rotor 10.

In some embodiments, the method further includes machining the excess material of the plugs 18 extending past the external surfaces 22, 24 of the blade 16 so that the surfaces 22, 24 are flush. The method may further include repeating these steps for additional blades 16 included in the rotor 10. A method may include inserting a plug 18 having a first plug density into the blade 16, operating the gas turbine engine 110 with the rotor 10 and the blade 16, and then removing the plug 18 and inserting a new plug 18 having a second plug density that is different than the first plug density.

Another embodiment of a rotor 210 in accordance with the present disclosure is shown in FIG. 5. The rotor 10 is substantially similar to the rotor 10 shown in FIGS. 1-4 and described herein. Accordingly, similar reference numbers in the 200 series indicate features that are common between the rotor 210 and the rotor 10. The description of the rotor 10 is incorporated by reference to apply to the rotor 210, except in instances when it conflicts with the specific description and the drawings of the rotor 210.

The rotor 210 includes the wheel 12, a plurality of blades 216, and a plurality of plugs 218 as shown in FIG. 5. The wheel 12 is arranged around the axis 11. The plurality of blades 216 comprising a first material are arranged around the wheel 12 and extend radially outwardly away from the wheel 12 relative to the axis 11 to interact with gases surrounding the rotor 210. In the illustrative embodiment, the second frequency blades 216 are configured to receive at least one plug 218 comprising a second material different from the first material of the blades 216. The plugs 218 are added to the blades 216 to mistune some of the plurality of blades and reduce flutter effects induced into the rotor 10 during operation of the engine 110.

Each of the blades 216 has an airfoil 228 having a first external surface 222, a second external surface 224, and a blade tip 230 as shown FIG. 5. The second external surface 224 is opposite the first external surface 222 to define a leading edge 232, a trailing edge 234, a pressure side 236, and a suction side 238 of the blade 216. The airfoil 228 has an aerodynamic shape for accelerating air through the gas turbine engine 110.

Each of the second frequency blades 216 further includes holes 242 as shown in FIG. 5. The holes 242 extend through the first external surface 222, into the blade 216, and out through the second external surface 224 in a direction 246 normal to the first external surface 222 indicated by line 248 at the blade tip 230.

Each plug 218 includes a first outer surface 250, a second outer surface 252, and a side surface 254 as shown in FIG. 5. The first outer surface 250 and the second outer surface 252 are each flush with the corresponding external surface 222, 224 of the blade 216 such that the outer surfaces 250, 252 are exposed to the gases surrounding the rotor 210. The side surface 254 extends between and interconnects the first outer surface 250 and the second outer surface 250.

In the illustrative embodiment, each blade 216 is at least partially hollow as shown in FIG. 5. The cavity 256 extends through the blade tip 230 such that a portion of the sidewall 254 of the each plug 218 is exposed to the cavity 256 formed in the blade tip 230.

Figure 6:
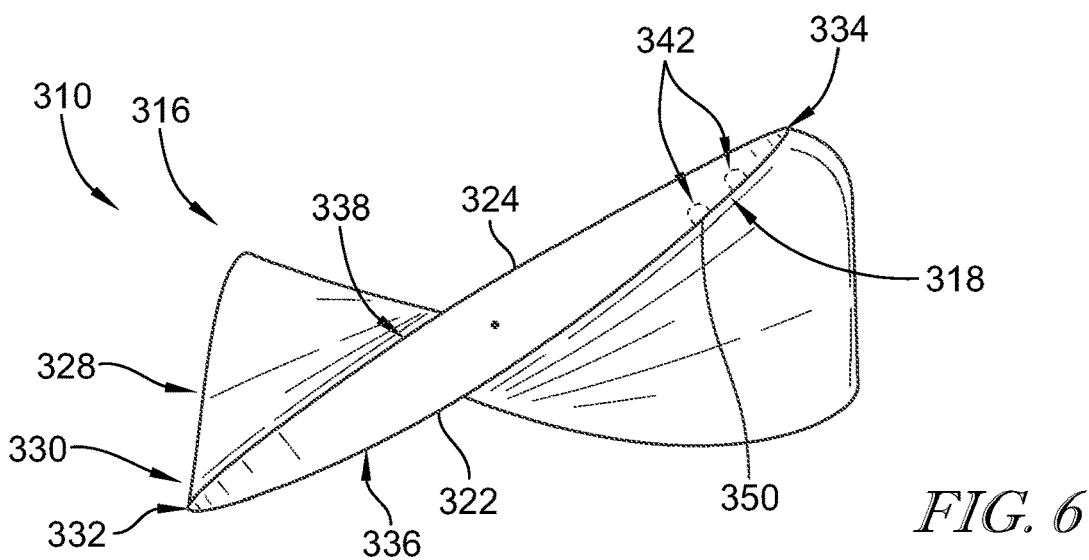
FIG. 6 is another embodiment of a rotor for use in the gas turbine engine of FIG. 1 showing the rotor includes at least one blade and plugs that extend through an external surface of the blade and partway into the blade.

Another embodiment of a rotor 310 in accordance with the present disclosure is shown in FIG. 6. The rotor 10 is substantially similar to the rotor 10 shown in FIGS. 1-4 and described herein. Accordingly, similar reference numbers in the 300 series indicate features that are common between the rotor 310 and the rotor 10. The description of the rotor 10 is incorporated by reference to apply to the rotor 310, except in instances when it conflicts with the specific description and the drawings of the rotor 310.

The rotor 310 includes the wheel 12, a plurality of blades 316, and a plurality of plugs 318 as shown in FIG. 6. The wheel 12 is arranged around the axis 11. The plurality of blades 316 comprising a first material are arranged around the wheel 12 and each extend radially outwardly away from the wheel 12 relative to the axis 11 to interact with gases surrounding the rotor 310. In the illustrative embodiment, the second frequency blades 316 are configured to receive at least one plug 318 comprising a second material different from the first material of the blades 316. The plugs 318 are added to the blades 316 to mistune some of the plurality of blades 316 and reduce flutter effects induced into the rotor 10 during operation of the engine 110.

Each of the blades 316 has an airfoil 328 having a first external surface 322, a second external surface 324, and a blade tip 330 as shown FIG. 6. The second external surface 324 is opposite the first external surface 322 to define a leading edge 332, a trailing edge 334, a pressure side 336, and a suction side 338 of the blade 316. The airfoil 328 has an aerodynamic shape for accelerating air through the gas turbine engine 110.

Each of the second frequency blades 316 further includes holes 342 as shown in FIG. 6. The holes 342 extend through the first external surface 322 and into the blade 316. The holes 342 are blind holes 342 that extend only partway in to the blade 316.

Each plug 318 includes a first outer surface 348 and a second outer surface 350 as shown in FIG. 6. The first outer surface 350 is flush with the first external surface 322 of the blade 316 such that the outer surface 350 is exposed to the gases surrounding the rotor 310. The second outer surface 352 engages the hole 342 formed in the blade 316. In some embodiments, the second outer surface 352 may be adhered to the surface forming the blind hole 342.

Figure 7:
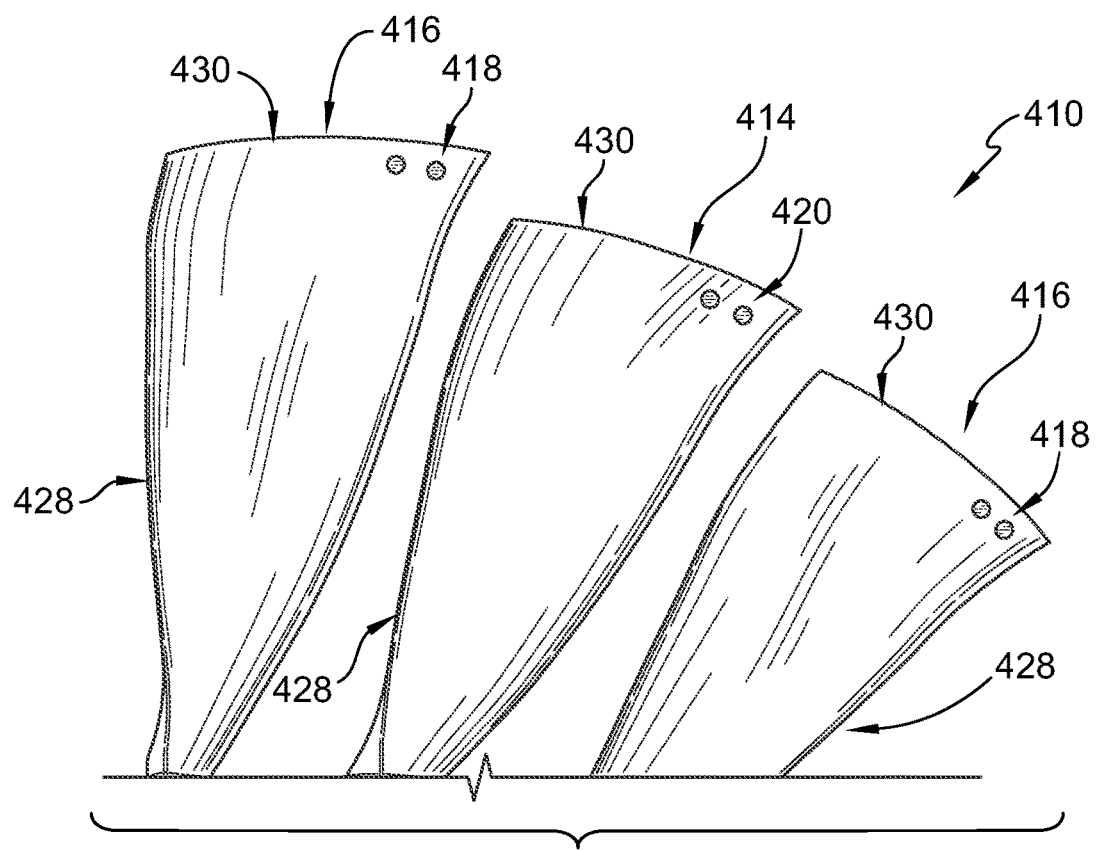
FIG. 7 is another embodiment of a rotor for use in the gas turbine engine of FIG. 1 showing the rotor includes a plurality of blades and a plurality of plugs, the plurality of plugs including first density plugs having a first density and arranged in first frequency blades and second density plugs having a second density different than the first density and arranged in second frequency blades so that the second frequency blades have a different mass than the first frequency blades.

Another embodiment of a rotor 410 in accordance with the present disclosure is shown in FIG. 7. The rotor 10 is substantially similar to the rotor 10 shown in FIGS. 1-4 and described herein. Accordingly, similar reference numbers in the 400 series indicate features that are common between the rotor 410 and the rotor 10. The description of the rotor 10 is incorporated by reference to apply to the rotor 410, except in instances when it conflicts with the specific description and the drawings of the rotor 410.

The rotor 410 includes the wheel 12, a plurality of blades 414, 416, and a plurality of plugs 418, 420 as shown in FIG. 7. The wheel 12 is arranged around the axis 11. The plurality of blades 414, 416 comprising a first material are arranged around the wheel 12 and extend radially outwardly away from the wheel 12 relative to the axis 11 to interact with gases surrounding the rotor 410.

In the illustrative embodiment, the plurality of blades 414, 416 are divided into a set of first frequency blades 414 and a set of second frequency blades 416 as shown in FIG. 7. Each of the first frequency blades 414 and the second frequency blades 416 are similarly sized. However, the second frequency blades 416 are configured to receive at least one first density plug 418 comprising a second material different than the first material of the blades 414, 416, and the first frequency blades 414 are configured to receive at least one second density plug 420 comprising a third material different than the first material of the blades 414, 416 and the second material of the plugs 418.

Each of the blades 416 includes an airfoil 428 having a blade tip 430 and a first torsion node line 440 as shown FIG. 7. The airfoil 428 has an aerodynamic shape for accelerating air through the gas turbine engine 110.

The plugs 418, 420 are added to the tips 430 of the blades 414, 416 to mistune the plurality of blades 414, 416 and reduce flutter effects induced into the rotor 410 during operation of the engine 110. In the illustrative embodiment, the second frequency blades 416 are alternated between the first frequency blades 414 about the wheel 12.

In the illustrative embodiment, the second material of the first density plug 418 has a density greater than a density of the first material of the blades 414, 416. The third material of the second density plug 420 has a density that is less than the density of the first material of the blades 414, 416.

By arranged the first density plugs 418 in the blade tip 430 of the first frequency blades 416, the overall weight of the rotor 410 increases since the density of the first density plug 418 is greater than the density of the first frequency blade 416. To minimize the amount of weight added to the rotor 410, the second density plugs 420 are arranged in the blade tip 430 of the second frequency blade 414. The lower density material of the second density plugs 420 reduces the weight of the second frequency blades 414, evening outer the weight added to the first frequency blades 416, while mistuning each of the blades 414, 416. This results in small density changes in adjacent blades which works to provide an overall difference between the two blades that is significant to adjust the frequency response of the blades.

A method of assembling and using the rotor 410 may include several steps. The method includes measuring a frequency response of the rotor 410 to obtain frequency data of the rotor 410, identifying one of the first frequency blades 416 included in the plurality of blades 414, 416 to vary a frequency response of the blade 416 based on the frequency data, and forming a first hole 442 that extends through the blade 416 in the direction normal to the external surface 422, 424 at a first location of the first frequency blade 416. In the illustrative embodiment, the first location on the blade 416 is based on the frequency data obtained during the measuring step.

The method further includes forming a first plug 418 made of the second material with a first density. The first density is selected based on the frequency data. The method further includes inserting the first plug 418 into the first hole 442 formed in the first blade to vary the frequency response of the rotor 410.

In the illustrative embodiment, the method may further include forming a second hole 442 different from the first hole 442 that extends through the blade 416 in the direction normal to the external surface 422, 424 at a second location on the first frequency blade 416 based on the frequency data. The second location is spaced apart from the first location along the blade tip 430.

The method further includes forming a second plug 418 made of the second material with the first density. The method further includes inserting the plug 418 into the second hole 442 formed in the first blade to vary the frequency response of the rotor 410.

In the illustrative embodiment, the method further includes identifying one of the second frequency blades 414 included in the plurality of blades 414, 416, forming a third hole 442 that extends through the blade 414 in the direction normal to the external surface 422, 424 at a third location on the second frequency blade 414. In the illustrative embodiment, the third location is based on the frequency data.

The method further includes forming a third plug 420 made of the third material with a second density. The second density material is selected based on the frequency data, and the second density being different from the first density of the other plugs 418 inserted in the first frequency blade 416.

The method further includes inserting the third plug 420 into the third hole 442 formed in the second frequency blade 414 to vary the frequency response of the rotor. In the illustrative embodiment, the method may further include forming a fourth hole 442 different from the third hole 442 that extends through the second frequency blade 414 in the direction normal to the external surface 422, 424 at a fourth location on the second frequency blade 414 based on the frequency data. The second location is spaced apart from the third location along the blade tip 430.

The method further includes forming the fourth plug 420 made of the third material with the second density. The method further includes inserting the fourth plug 420 into the fourth hole 442 formed in the second frequency blade 414 to vary the frequency response of the rotor 410.

In some embodiments, the method further includes machining the excess material of the plugs 418, 420 extending past the external surfaces 422, 424 of the blades 414, 416 so that the surfaces 422, 424 are flush. The method may further include repeating these steps for additional blades 414, 416 included in the rotor 410.

Figure 8:
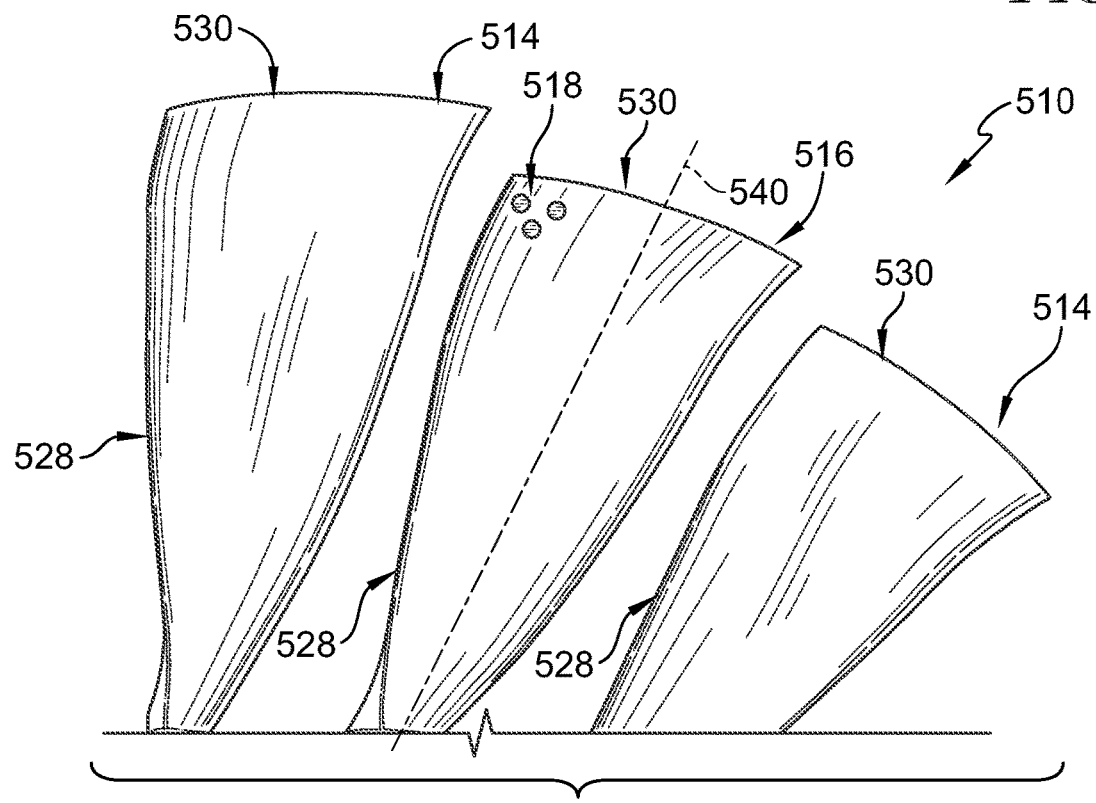
FIG. 8 is another embodiment of a rotor for use in the gas turbine engine of FIG. 1 showing the rotor includes a plurality of blades and a plurality of plugs that each extend through a tip of the blade to change the mass at the blade tip to alter the frequency of the blade.

Another embodiment of a rotor 510 in accordance with the present disclosure is shown in FIG. 8. The rotor 10 is substantially similar to the rotor 10 shown in FIGS. 1-4 and described herein. Accordingly, similar reference numbers in the 500 series indicate features that are common between the rotor 510 and the rotor 10. The description of the rotor 10 is incorporated by reference to apply to the rotor 510, except in instances when it conflicts with the specific description and the drawings of the rotor 510.

The rotor 510 includes the wheel 12, a plurality of blades 514, 516, and a plurality of plugs 518 as shown in FIG. 7. The wheel 12 is arranged around the axis 11. The plurality of blades 514, 516 comprising a first material are arranged around the wheel 12 and extend radially outwardly away from the wheel 12 relative to the axis 11 to interact with gases surrounding the rotor 510.

In the illustrative embodiment, the plurality of blades 514, 516 are divided into a set of first frequency blades 514 and a set of second frequency blades 516 as shown in FIG. 7. Each of the first frequency blades 514 and the second frequency blades 516 are similarly sized. However, the second frequency blades 516 are configured to receive a plurality of plugs 518 comprising a second material different from the first material of the blades 514, 516. In the illustrative embodiment, at least three plugs 18 are added to each blade 516.

Each of the blades 516 includes an airfoil 528 having a blade tip 530 and a first torsion node line 540 as shown FIG. 8. The airfoil 528 has an aerodynamic shape for accelerating air through the gas turbine engine 110. The blade tip 530 extends from the airfoil 528. The first torsion node line 40 extends radially along the blade 514, 516.

The plugs 518 are added to the tips 530 of the blades 516 to mistune the plurality of blades 516 and reduce flutter effects induced into the rotor 510 during operation of the engine 110. In the illustrative embodiment, the second frequency blades 516 are alternated between the first frequency blades 514 about the wheel 12.

In the illustrative embodiment, the three plugs 518 extend through the blade tip 530 forward of the first torsion node line 540. The plugs 518 are spaced apart along the blade tip 530 and also spaced apart radially inward of one another.

The present disclosure relates to reducing flutter effects induced into rotors 10, 210, 310, 410, 510 during operation of the gas turbine engine 110. Flutter is a common aeromechanic phenomenon that may lead to excessive airfoil vibratory stress and eventual airfoil failure. These flutter affects may be difficult to accommodate when combined with other airfoil requirements, and the frequency of the rotor may also be difficult to assess and verify until the overall designs are complete.

In some embodiments, flutter mitigations may use mass mistuning in which the existing airfoil shape is changed and creates one or more geometric standards on the same rotor. This may cause further issues however, since the new airfoil may exhibit adverse qualities, such as efficiency and forcing response.

To combat the flutter affects, the illustrative embodiments include mass mistuning of the blades 16, 216, 316, 414, 416, 516 by adding plugs 18, 218, 318, 418, 420, 518 of differing material to the blade tip 30, 230, 330, 430, 530, through the blade thickness. By selecting the plug material and location, the blades 16, 216, 316, 414, 416, 516 may be mass mistuned. Additionally, since the plugs 18, 218, 318, 418, 420, 518 are applied through the blade thickness; the airfoil shape of the blade 16, 216, 316, 414, 416, 516 may be maintained without affecting the aerodynamics of the airfoil 28, 228, 328, 428, 528.

In the illustrative embodiment, the holes 42, 242, 342 are formed by simple drilling and the plugs 18, 218, 318, 418, 420, 518 may be press fit or threaded into place. Additional methods like adhesives or knurling may also be used to retain the plug 18, 218, 318, 418, 420, 518. Different plug materials may be used to finely tune the blade frequencies and may be more or less dense than the first material of the blades 16, 216, 316, 414, 416, 516.

In some embodiments, the plug may be made from aluminum, titanium, steel, nickel, tungsten, polymer or other materials that provide enough weight density differential to the base material. The density differential between the blades 16, 216, 316, 414, 416, 516 and the plugs 18, 218, 318, 418, 420, 518 provides the mass mistuning.

The benefits of the mass mistuning arrangement of the present disclosure may include modifying an existing blade to achieve the desired frequency without affecting the existing aerodynamic airfoil shape of the blades 16, 216, 316, 414, 416, 516, as the plugs 18, 218, 318, 418, 420, 518 may be flush with the aerodynamic surfaces 22, 24, 222, 224, 322, 324. Further, the present disclosure teaches using a simplified mass mistuning arrangement by using different plug materials and locations to tune the blade 16, 216, 316, 414, 416, 516.

In some embodiments, the present disclosure teaches a rotor 10, 210, 310, 410, 510 that allows the blades 16, 216, 316, 414, 416, 516 that are damaged during use of the gas turbine engine 110 from foreign object damage may be retuned. The blades 16, 216, 316, 414, 416, 516 may be retuned by adjusting the plugs 18, 218, 318, 418, 420, 518 along with blade frequency data. The present disclosure also teaches a rotor 10, 210, 310, 410, 510 that may allow complex combinations of mass tuning since the blades 16, 216, 316, 414, 416, 516 may be tuned to individual airfoil frequencies.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A rotor for use in a gas turbine engine, the rotor comprising
    a wheel arranged around an axis,
    a first blade comprising a first material and extending radially outwardly away from the wheel relative to the axis to allow the first blade to interact with gases surrounding the rotor, the first blade having a first external surface, a second external surface opposite the first external surface to define a leading edge, trailing edge, pressure side, and suction side of the first blade, and a first hole that extends through the first external surface and into the first blade in a direction normal to the first external surface, and
    a first plug located in the first hole and having a first outer surface flush with the first external surface of the first blade such that the first outer surface is exposed to the gases surrounding the rotor, and the first plug comprises a second material that is different than the first material of the first blade,
    wherein the first hole is a through hole that extends entirely through the first external surface and the second external surface and wherein the first plug includes a second outer surface that is flush with the second external surface and exposed to the gases surrounding the rotor,
    wherein the first blade includes a base located adjacent the wheel and a blade tip spaced apart radially outward from the base and the first hole is located at the blade tip, and
    wherein the first plug includes a side wall that extends between the first outer surface and the second outer surface and the first blade is at least partially hollow in the blade tip such that the side wall of the first plug is exposed to a cavity formed in the blade tip.

2. The rotor of claim 1, wherein the first hole is located at the trailing edge of the first blade.

3. The rotor of claim 2, wherein the rotor is a fan rotor, the first blade is a fan blade, and the first material comprises metallic materials and the second material comprises polymeric materials.

4. The rotor of claim 3, further comprising a second blade that extends radially away from the wheel and a second plug coupled with the second blade, the second blade directly neighboring the first blade circumferentially and having a first external surface, a second external surface opposite the first external surface of the second blade to define a leading edge, a trailing edge, a pressure side, and a suction side of the second blade, and a second hole that extends into the second blade in a direction normal to the first external surface of the second blade, the second plug located in the second hole and comprising a third material that is different than the second material.

5. The rotor of claim 4, wherein the second material has a density greater than a density of the first material and the third material has a density that is less than the density of the first material.

6. A rotor for use in a gas turbine engine, the rotor comprising
    a wheel arranged around an axis,
    a first blade having a first external surface and a second external surface opposite the first external surface to define a leading edge, trailing edge, pressure side, and suction side of the first blade, the first external surface and the second external surface adapted to be exposed to and interact with gases surrounding the first blade, and the first external surface and the second external surface extend radially relative to the axis,
    a first plug that extends into the first external surface of the first blade, and
    a second blade that extends radially away from the wheel, the second blade directly neighboring the first blade circumferentially and having a first external surface, a second external surface opposite the first external surface of the second blade to define a leading edge, a trailing edge, a pressure side, and a suction side of the second blade, and
    a second plug that extends into the first external surface of the second blade, and the second plug has a density that is different than a density of the first plug,
    wherein the first plug comprises a first material having a density that is greater than a density of the first blade and the second plug comprises a second material having a density that is less than the density of the first blade.

7. The rotor of claim 6, wherein the rotor is a fan rotor, the first blade is a fan blade, and the first plug comprises polymeric materials.

8. The rotor of claim 7, wherein the first plug extends entirely through the first blade and is flush with the first external surface and the second external surface.

9. The rotor of claim 8, wherein the first blade includes a base located adjacent the wheel and a blade tip spaced apart radially outward from the base and the first plug is located at the blade tip.

10. The rotor of claim 9, wherein the first plug is located at the trailing edge of the first blade.

11. The rotor of claim 6, wherein the first plug extends axially and circumferentially through the first blade.

12. A method comprising
providing a rotor having a wheel arranged around an axis and a plurality of blades that extend radially outward away from the wheel,
measuring a frequency response of the rotor to obtain frequency data of the rotor,
identifying a first blade included in the plurality of blades to vary a frequency response of the first blade based on the frequency data,
forming a first hole that extends into a radially extending external surface of the first blade at a first location, the first location being based on the frequency data,
forming a first plug made of a first material with a first density, the first density being selected based on the frequency data, and
inserting the first plug into the first hole formed in the first blade to vary the frequency response of the rotor.

13. The method of claim 12, wherein the first hole extends into the external surface of the first blade in a direction normal to the external surface and the first hole is a through hole that extends through the first blade.

14. The method of claim 13, further comprising
identifying a second blade included in the plurality of blades,
forming a second hole that extends into a radially extending external surface of the second blade at a second location, the second location being based on the frequency data,
forming a second plug made of a second material with a second density, the second density material being selected based on the frequency data, and the second density being different than the first density, and
inserting the second plug into the second hole formed in the second blade to vary the frequency response of the rotor.

\* \* \* \* \*